United States Patent [19]
Larkin

[11] Patent Number: 5,976,046
[45] Date of Patent: Nov. 2, 1999

[54] MULTI-RANGE, HYDROMECHANICAL TRANSMISSION FOR APPLICATION IN HIGH PERFORMANCE AUTOMOTIVE DRIVETRAINS

[75] Inventor: Robert Francis Larkin, Pittsfield, Mass.

[73] Assignee: General Dynamics Land Systems, Inc., Sterling Heights, Mich.

[21] Appl. No.: 09/058,784

[22] Filed: Apr. 13, 1998

Related U.S. Application Data

[60] Provisional application No. 60/044,326, Apr. 25, 1997.

[51] Int. Cl.$^6$ .................................................. F16H 47/04
[52] U.S. Cl. .................................. 475/72; 475/80; 475/81
[58] Field of Search ................................ 475/71, 72, 76, 475/80, 81, 82

[56] References Cited

U.S. PATENT DOCUMENTS

| | | | |
|---|---|---|---|
| 3,596,535 | 8/1971 | Polak | 475/72 |
| 4,754,664 | 7/1988 | Dick | 475/72 |
| 5,423,183 | 6/1995 | Folsom | 475/72 |
| 5,486,142 | 1/1996 | Folsom | 475/81 |
| 5,535,589 | 7/1996 | Folsom | 475/81 |
| 5,678,405 | 10/1997 | Folsom | 475/72 |
| 5,730,678 | 3/1998 | Larkin | 475/72 |

FOREIGN PATENT DOCUMENTS

| | | |
|---|---|---|
| 0 003 397 | 8/1979 | European Pat. Off. . |
| 2 412 760 | 7/1979 | France . |
| 2 679 975 | 2/1993 | France . |
| 43 11 083 | 7/1994 | Germany . |
| WO/9732145 | 9/1997 | WIPO . |
| WO/9744596 | 11/1997 | WIPO . |

OTHER PUBLICATIONS

U.S. Application No. 08/857,501.

*Primary Examiner*—Khoi Q. Ta
*Attorney, Agent, or Firm*—Finnegan, Henderson, Farabow, Garrett & Dunner, L.L.P.

[57] ABSTRACT

A multi-range, synchronous shifting, hydromechanical transmission according to the present invention is suitable for application in an automotive drivetrain including a high speed engine. The transmission receives split power inputs from the engine; one input being geared down to a suitable lower speed for driving a continuously variable hydrostatic transmission unit, while the other input drives a counter shaft from which mechanical outputs are take at different speed ratios. A planetary gear set, driven by the hydrostatic transmission unit output, is shiftable to provide either a narrow continuously variable speed hydrostatic output, range suitable for transmission operation in low output ranges or a wide continuously variable speed hydrostatic output range suitable for transmission operation in high output ranges. A gear system includes a plurality of gears selectively conditioned by plural clutches and brakes to combine the hydrostatic outputs from the planetary gear set and the mechanical outputs from the counter shaft, such as to produce vehicle propulsion transmission outputs in any one of four continuously variable speed forward ranges and one continuously variable speed reverse range.

10 Claims, 3 Drawing Sheets

| $R_{NG}$ | B1 | B2 | B3 | CL1 | CL2 | CL3 | BD1 | STROKE | OUTPUT SPEED |
|---|---|---|---|---|---|---|---|---|---|
| 1 | X | | | | | X | | 0.0 - 98.2% | 0.0 - .249$N_E$ |
| 2 | | | X | | | X | | 98.2% - 0.0 | .249 - .501$N_E$ |
| 3 | | | | | X | | X | 0.0 - 93.3% | .501 - .930$N_E$ |
| 4 | | | | X | | | X | 93.3% - 0.0 | .930 - 1.36$N_E$ |
| R | | X | | | | X | | 0.0 - 100.0% | 0.0 - .256$N_E$ |

MULTI-RANGE, HYDROMECHANICAL TRANSMISSION FOR APPLICATION IN HIGH PERFORMANCE AUTOMOTIVE DRIVETRAINS

CROSS REFERENCE TO RELATED APPLICATION

This application claims benefit of Provisional Application No. 62/044,326, filed Apr. 25, 1997.

The present application is related to applicant's copending application entitled "Multi-Range, Hydromechanical Transmission For Off-Road Vehicles," Ser. No. 08/857,501, filed May 16, 1997 and U.S. Pat. Nos. 5,423,183; 5,486,142; 5,535,589; 5,730,678; and 5,678,405. The disclosures of these related application and patents are incorporated herein by reference.

BACKGROUND OF THE INVENTION

1. Field of the Invention

The present invention relates to a multi-range, synchronously shiftable, regenerative, continuously variable hydromechanical transmission. More particularly, the invention relates to a multi-range, synchronously shiftable, regenerative, continuously variable hydromechanical transmission suitable for application to high speed engines.

2. Description of the Related Art

Over the years, many vehicle drivetrains have been designed to utilize hydraulic transmission for multiplying engine torque to accelerate a vehicle from rest to a desired maximum speed. However, such design efforts have typically resulted in hydraulic transmissions that, although having acceptable torque capacity, are undesirably large and heavy. Moreover, such transmissions have exhibited less than optimum efficiency, resulting in loss of fuel economy and/or transmission performance.

As an alternative to the purely hydraulic transmissions, hydromechanical transmissions have been utilized in drivetrains for large off-road construction and military vehicles. Such transmissions are typically of a split power input type. In the split power input type transmission, a hydrostatic power unit (HSU) and a mechanical power unit are driven in parallel by a vehicle engine. The HSU converts its split portion of input power from the engine into hydrostatic output power that can be infinitely varied in speed and torque over a particular hydrostatic stroke range. This hydrostatic output power is then combined with the split portion of engine power in the mechanical power unit to produce hydromechanical output power in multiple transmission ranges. The speed and torque in each of the transmission ranges, which are initially set by gear ratios of the mechanical power unit, can be infinitely varied by varying the stroke of the HSU.

A properly designed hydromechanical transmission can advantageously provide synchronous range shifting that affords smooth and uninterrupted power flow from engine to driving wheels, as the vehicle is accelerated from rest to maximum speed. An additional benefit is that the engine may be operated at or near its peak efficiency output speed, regardless of transmission output speed.

However, there are several limitations in utilizing the HSU for vehicle transmissions. One limitation is the input speed capacity of the HSU with respect to its output torque potential. Speed capacity (RPM) is limited by high centrifugal loading on certain internal components of the HSU and the ability to supply replenishment hydraulic fluid to replace losses due to leakage. This limitation is of less concern for relatively low speed engine applications, such as diesel engines. Diesel engines generally have the maximum engine speed of less than 2600 rpm. Thus, the HSU can be directly driven by a diesel engine. On the other hand, maximum speeds of gasoline engines can, for example, reach 6000 rpm. Therefore, when the HSU is coupled with such a high speed engine, the input speed of the HSU must be reduced, i.e., geared down, to a speed that is safely acceptable for the HSU.

However, gearing down the input speed of the HSU has undesirable effect of reducing the output speed of the HSU and thus the overall ratio range of the transmission itself. That is, if the input speed of the HSU is reduced to 50% of the engine speed, then the maximum output speed of the HSU is also reduced to 50% at 1:1 input-output speed ratio. Moreover, because torque is inversely proportional to speed, a HSU with a larger capacity is necessary to accommodate the same engine power.

While high output torque is required to start a vehicle in motion from rest, fortunately, torque requirements decrease as vehicle speed increases. Therefore, it is desirable to provide a high speed driven hydromechanical transmission that takes advantage of both the higher starting torque capacity of a geared-down HSU and the increased output speed of a geared-up HSU.

SUMMARY OF THE INVENTION

One object of the invention is to provide a multi-range, continuously variable hydromechanical transmission suitable for high speed engines. Additional objects and advantages of the invention will be set forth in part in the description which follows, and in part will be obvious from the description, or may be learned by practice of the invention. The advantages and purpose of the invention will be realized and attained by the elements and combinations particularly pointed out in the appended claims.

To attain the advantages and in accordance with the purposes of the invention, as embodied and broadly described herein, the invention comprises a multi-range hydromechanical transmission for transmitting power from a prime mover to a load. The multi-range hydromechanical transmission includes a continuously variable hydrostatic transmission unit having an input and an output. A speed reduction unit couples an output of the prime mover to the hydrostatic transmission output, such as to drive the hydrostatic input at input speeds lower than output speeds of the prime mover. A first gear set is driven by the hydrostatic transmission unit output to produce a hydrostatic input shiftable between first and second continuously variable hydrostatic output speed ranges. The second hydrostatic output speed range is wider than the first hydrostatic speed range. A gear system includes at least second and third gear sets having gear elements connected to receive the hydrostatic output of the first gear set and connectable to receive mechanical inputs from the prime mover at first and second speed ratios, and shift means for selectively clutching and/or braking the gear elements of the first, second, and third gear sets to shift the hydromechanical transmission between the output speed range, that is continuously variable by stroking the hydrostatic transmission unit through the first hydrostatic output speed range and another higher speed range that is continuously variable by stroking the hydrostatic transmission unit through the second hydrostatic output speed range.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with the invention, a multi-range hydromechanical transmission for transmitting power from a prime mover to a load, is provided with a continuously variable hydrostatic transmission unit having an input and an output; a speed reduction unit for coupling an output of the prime mover to the hydrostatic transmission output, such as to drive the hydrostatic input at input speeds lower than output speeds of the prime mover; a first gear set driven by the hydrostatic transmission unit output to produce a hydrostatic input shiftable between first and second continuously variable hydrostatic output speed ranges, the second hydrostatic output speed range being wider than the first hydrostatic speed range; a gear system including at least second and third gear sets having gear elements connected to receive the hydrostatic output of the first gear set and connectable to receive mechanical inputs from the prime mover at first and second speed ratios; and shift means for selectively clutching and/or braking the gear elements of the first, second, and third gear sets to shift the hydromechanical transmission between the output speed range, that is continuous variable by stroking the hydrostatic transmission unit through the first hydrostatic output speed range and another higher speed range that is continuously variable by stroking the hydrostatic transmission unit through the second hydrostatic output speed range.

Figure 1:
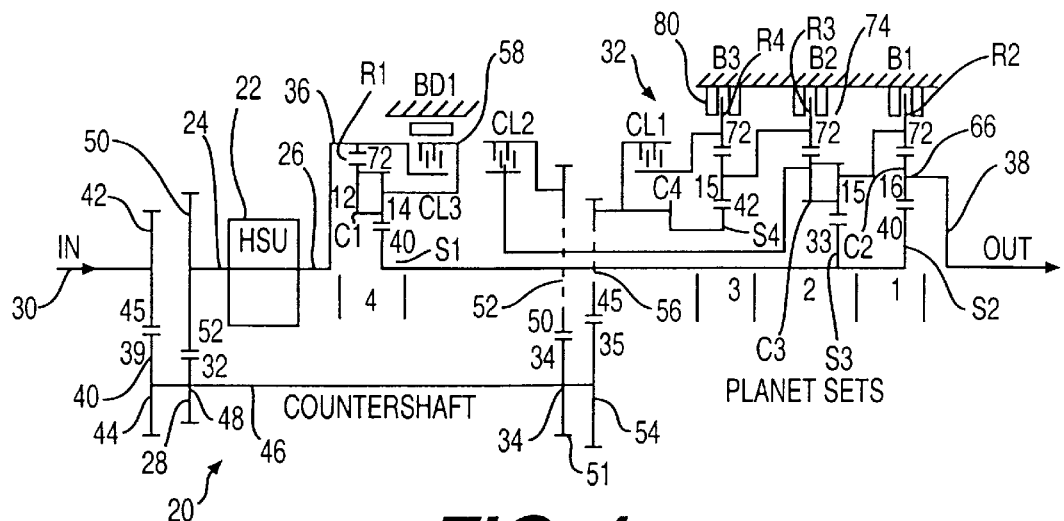
FIG. 1 is a schematic diagram of a vehicular multi-range hydromechanical transmission according to a preferred embodiment of the present invention.

In the embodiment illustrated in FIG. 1, a multi-range hydromechanical transmission, generally designated by the reference numeral 20, is shown to include a hydrostatic transmission unit (HSU) 22 having an input shaft 24, an output shaft 26, and a capability of providing infinitely variable input/output speed ratios between minimum and maximum values. The transmission ratio of HSU 22 may be infinitely varied in the manner disclosed in the patents and applications referenced above. A speed reduction unit, designated by the reference number 28, connects an output shaft 30 of a prime mover (not shown) to input shaft 24 to drive HSU 22 at input speeds lower than the prime mover output speed. A power transmitting gear system is generally designated by the reference number 32. Power transmitting gear system 32 has a plurality of gear sets to be described, a first gear system input 34 geared to power output shaft 30 of the prime mover, a second gear system input 36 connected to HSU output 26, a transmission output 38 for connection to a driven load (not shown), and control means for shifting the gear system between at least two speed ratio ranges so that infinite variations of the input/output speed ratios between minimum and maximum unit ratio provide continuously variable speeds throughout at least two speed ratio ranges at transmission output 38. Power transmitting gear system 32 also includes a gear set 58 providing either a speed increasing connection of second gear system input 36 for the highest of the at least two speed ratio ranges or a direct connection of second gear system input 36 for the lowest of the at least two speed ratio ranges. First gear set 58 will be described in detail later.

Further as shown in FIG. 1, power output shaft 30 of the primer mover is connected to a speed increasing unit 40. A prime mover suitable for this invention has a relatively high output speed capability common to gasoline engines used for automobiles. Speed increasing unit 40 is preferably a pair of spur gears 44 and 42 having gear ratio of, for example, 45:39. Larger spur gear 42 is connected to and directly driven by output shaft 30 of the prime mover and meshes with the other, smaller spur gear 44, which is fixed to the left end of a counter shaft 46.

Speed reduction unit 28 is preferably a pair of spur gears 48, 50 having a gear ratio of, for example, 32:52. Smaller gear 48 of the spur gears is fixed on counter shaft 46 and thus is driven by the prime mover at the same speed as smaller gear 44 of the speed increasing unit 40. The other, larger spur gear 50, which meshes with smaller gear 48, is connected to input shaft 24 of HSU 22. As a result of this gear configuration, HSU 22 is driven at a slower speed than that of power output 30 of the prime mover.

HSU 22 is controlled to convert the speed on its input shaft 24 to a continuously variable speed on its output shaft 26 at speed ratios ranging from 1:0 to at least 1:1. The maximum stroke of HSU 22 is preferably 100%, i.e., when input speed is equal to output speed.

First gear system input 34, a mechanical input, of power transmitting gear system 32 is connected to power output 30 of the prime mover and second gear system input 36, a hydrostatic input, is connected to HSU output 26. First gear system input 34 preferably has two pairs of meshing spur gear sets of different gear ratios. As shown in FIG. 1, two spur gears 51 and 54 are driven directly off counter shaft 46. It can thus be seen that spur gears 51 and 54 rotate at the same speed as spur gears 44 and 48. Spur gear 51 meshes with another spur gear 52, constituting a first drive ratio. The gear ratio of this first drive ratio connection, i.e., the gear ratio input to gear system 32 of spur gears 51 and 52 may be, for example, 34:50. Spur gear 54 meshes with another spur gear 56, defining a second drive ratio input to gear system 32. The gear ratio of this second drive ratio connection, i.e., the gear ratios of spur gears 54 and 56, may be, for example, 39:45. Given these exemplary gear ratios, spur gear 56 is driven at the same speed as the prime mover input speed on shaft 30.

Power transmitting gear system 32 preferably includes four planetary gear sets. First planetary gear set 58 includes a sun gear S1, planet gears (not shown), a planet carrier C1, and a ring gear R1 connected to and driven by the hydrostatic output 26 of HSU 22. In an exemplary embodiment of the present invention, the ratios of sun gear S1, the planet gears, and ring gear R1 of the first planetary gear set 58 are 40:14:72, respectively. Preferably, the gear elements of first planetary gear set 58 are arranged in a compound configuration, i.e., double planet gears, and have the gear ratios of 40:14:14:72. A second planetary gear set 66 also has a ring gear R2, a sun gear S2 connected to sun gear S1 of first planetary gear set 58, and a planet carrier C2 connected to the transmission output 38. By way of example, the ratios of sun gear S2, the planet gears, and the ring gear R2 of the second planetary gear set 66 may be 40:16:72, respectively, and are arranged in a simple configuration. A third planetary gear set 74 has a sun gear S3 commonly connected with sun gears S1 and S2, a planet carrier C3 connected to ring gear R2 of the second planetary gear set 66, and a ring gear R3. Similarly, a fourth planetary gear set 80 has a sun gear S4 connected to the second drive ratio input on spur gear 56, a planet gear carrier C4 connected to ring gear R3 of third planetary gear set 74, and a ring gear R4. For example, the sun-planet-ring gear ratios of planetary gear sets 74 and 80 may be 38:15:15:72 and 42:15:72, respectively. Planetary gear set 74 is, preferably, of compound configuration; while planetary gear sets 66 and 80 are of simple configuration.

First planetary gear set 58 has control means including a brake BD1 for selectively grounding planet carrier C1 such that the hydrostatic input on ring gear R1 drives sun gear S1 of the planet gear at a speed greater than the hydrostatic input speed. The control means further includes a clutch CL3 for selectively connecting ring gear R1 and planet carrier C1, such that the hydrostatic input on the interconnected ring gear R1 and carrier C1 drives sun gear S1 at a speed equal to the hydrostatic input speed at output 26 of HSU 22.

In the preferred embodiment, the control means further includes brakes B1, B2, B3, for selectively "grounding" the ring gears of each of the second, third, and fourth planetary gear sets, 66, 74, and 80, respectively. Moreover, the control means also includes a clutch CL1, for selectively connecting ring gear R4 of the fourth planetary gear set 80 to the second drive ratio input on spur gear 56, and a clutch CL2 for selectively connecting planet carrier C3 of third planetary gear set 74 to the first drive ratio input on spur gear 52.

To facilitate an explanation of the operation of transmission, the following description takes advantage of the analysis technique described in the article "Lever Analogy—A New Toot In Transmission Analysis," by Benford et al., Society of Automotive Engineers, Pub. No. 810102 (1981). According to this technique, a planetary gear set, at rest, can be analogized by a vertical line (lever), with its sun gear, ring gear, and planet carrier represented as points on this line; these points being relatively positioned in accordance with the numbers of sun gear and ring gear teeth, i.e., gear ratio.

Figure 2:
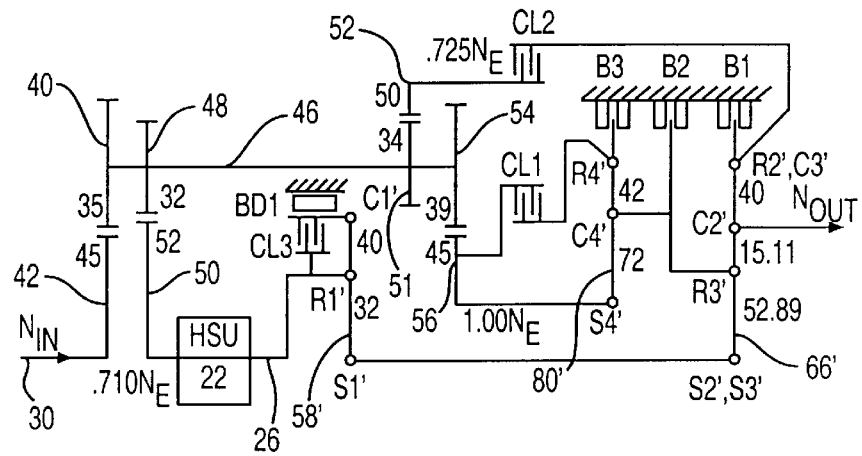
FIG. 2 is a Lever Analogy diagram representing a vehicular multi-range hydromechanical transmission according to the preferred embodiment of FIG. 1.
Figure 3:
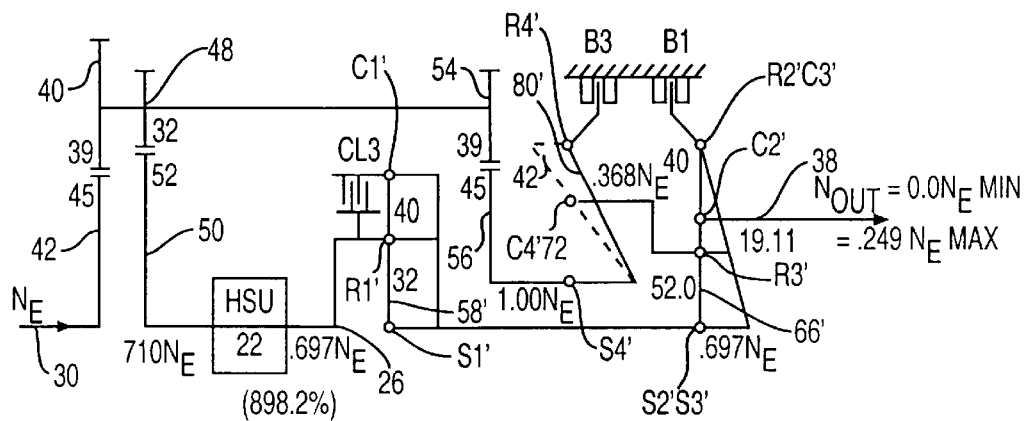
FIGS. 3–7 are Lever Analogy diagrams providing graphic analyses of the speed operation of the preferred vehicular multi-range hydromechanical transmission of FIG. 1 in each of its multiple transmission ranges.

FIG. 2 is a static graphical representation of the four planetary gear sets 58, 66, 74, and 80 of FIG. 1 as three vertical levers. In accordance with this Lever Analogy technique and by virtue of the interconnects of planetary gear sets 66 and 74, these two gear sets may be represented as a single vertical lever 66'. Planetary gear sets 58 and 80 are represented by vertical lines 58' and 80', respectively. This analytical format facilitates calculations of transmission performance. As also represented in FIG. 3, points S1', C1', and R1' on lever 58' represent sun gear S1, planet carrier C1, and ring gear R1, respectively, of the first planetary gear set 58.

Point S2'S3' on lever 66' represents interconnected sun gears S2 and S3, which always rotate at the same speed. Point R2'C3' on lever 66' represents the interconnected ring gear R2 and planet carrier C3. Points C2' and R3' on lever 66' represent planet carrier C2 and ring gear R3, respectively. Points S4', C4', and R4' represent sun gear S4, planet carrier C4, and ring gear R4, respectively, of fourth planetary gear set 80.

From FIG. 2, it can be seen that input 24 to HSU 22 is geared down through the speed reduction unit 28 to 71% of engine speed (Ne) at power input 30 from the prime mover. As previously stated, HSU 22 has a continuously variable ratio capability of input/output speed ranging from 0:1 to 1:1.

Figures 7, 8:
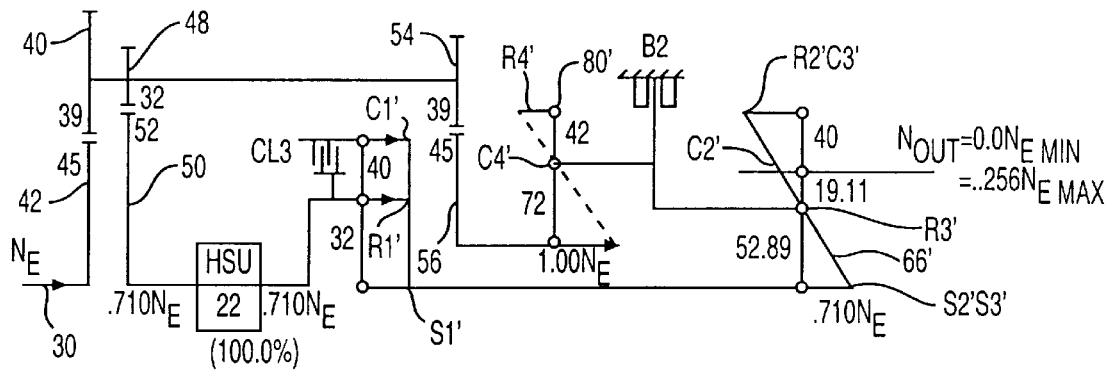
FIG. 8 is a table indicating which of the multiple brakes and clutches in FIG. 1 are engaged and performance parameters in each of the transmission ranges.

As shown in the table of FIG. 8, the brake B1 and clutch CL3 are the only elements of the control means that are engaged to shift the transmission into a first forward range. From FIG. 1, it can be seen that engagement of brake B1 grounds ring gear R2 of second planetary gear set 66 and engagement clutch CL3 interconnects ring gear R1 and planet carrier C1 of first planetary gear set 58. Thus, the only input to the power transmitting gear system is hydrostatic output 26 of HSU 22 applied to interconnected ring gear R1 and planet carrier C1, which drives sun gear S1 at the same speed as the HSU output speed. Sun gear S1 then drives sun gear S2 of second planetary gear set 66. By virtue of the reaction force imposed on ring gear R2 by brake B1, sun gear S2 drives planet carrier C2 of second planetary gear set 66, which is connected to transmission output 38, at a speed ratio determined by the gear ratios of second planetary gear set 66.

FIG. 3 is a graphical representation according to the Lever Analogy of transmission in FIG. 1 at the shift point between first and second forward ranges. In the first forward range, transmission output 38 is zero when the hydrostatic output 26 of the HSU 22 is zero, i.e., 1:0 input/output ratio. In this state, the transmission may be said to be in neutral. Because clutch CL3 connects planet carrier C1 and ring gear R1 together, sun gear S1 is driven by the interconnected planet carrier C1 and ring gear R1 at the speed of HSU output 26 as HSU 22 is stroked upwardly toward the 1:1 ratio. Thus, the lever representing planetary gear set 58 illustrated in FIG. 3 is shifted rightwardly, while retaining its vertical orientation, as HSU 22 is upstroked in the first forward range. It can be seen that the engagement of clutch CL3 makes the first planetary gear set 58 work as a 1:1 power transmitter, and thus the HSU output on sun gear S1 drives sun gears S2 and S3 at the HSU output speed.

It will be noted that, in first forward range, first gear system input 34 receives power engine output 30 through a speed reduction unit 40 and the counter shaft 46. Because the gear ratio of second drive ratio connection, provided by spur gears 54 and 56, has the inverse gear ratio of speed reduction unit 40, sun gear S4 of fourth planetary gear set 80 is driven at engine speed Ne. However, since brake B3 is not engaged, no reaction force is improved on ring gear R4, and thus carrier C4 is not driven by the mechanical input on sun gear S4. Furthermore, since clutches CL1 and CL2 are not engaged, the mechanical input on counter shaft 46 does not contribute to transmission output 38. Thus, first forward range is purely a hydrostatic speed range powered solely by HSU output 26.

Still referring to FIG. 3, when HSU 22 is stroked upwardly from 0% stroke to, for example, 98.2% stroke, at the upper end of first upward range, sun gears S1, S2 and S3 achieve a maximum speed of 0.697 Ne by virtue of speed increasing spur gear set 40, 42 and speed reduction spur gear set 48, 50. Because the brake B1 grounds the interconnected ring gear R2 and planet carrier C3, lever 66' in FIG. 3 pivots counterclockwise about point R2'C3' as HSU 22 is upstroked to maximum 98.2% stroke and maximum speed of 0.697 Ne on sun gears S2, S3. This results in a rightward shift of point C2', indicating an increasing forward speed on planet carrier C2, which is connected to transmission output 38. By virtue of the combine gear ratio of interconnected planetary gear sets 66 and 74, the maximum speed of transmission output 38 reaches 0.249 Ne at the upper end of (98.2% HSU strokes) first forward range.

As noted above, sun gear S4 is driven at engine speed (1.0 Ne) throughout first forward range. Thus, lever 80' assumes the dashed line angular orientation illustrated in FIG. 3 at 0% to HSU stroke. Since planet carrier C4 of planetary gear set 80 is tied to ring gear R3 of planetary gear set 74, the equal forward speeds of these two gear elements track each other as HSU 22 is upstroked through first forward range. Thus, lever 80' assumes the solid line orientation seen in FIG. 3 with a zero speed on ring gear R4 at the first and second forward range shift point.

As shown in the table of FIG. 8, clutch CL3 is engaged in both first and second forward ranges. Thus, shifting from first forward range into second forward range involves disengaging brake B1 as brake B3 is engaged. The actuation of brake B3 grounds ring gear R4 of fourth planetary gear set 80. Since ring gear R4 is stationary at the first to second range shift point, a synchronous shift into second forward range is achieved.

Figure 4:
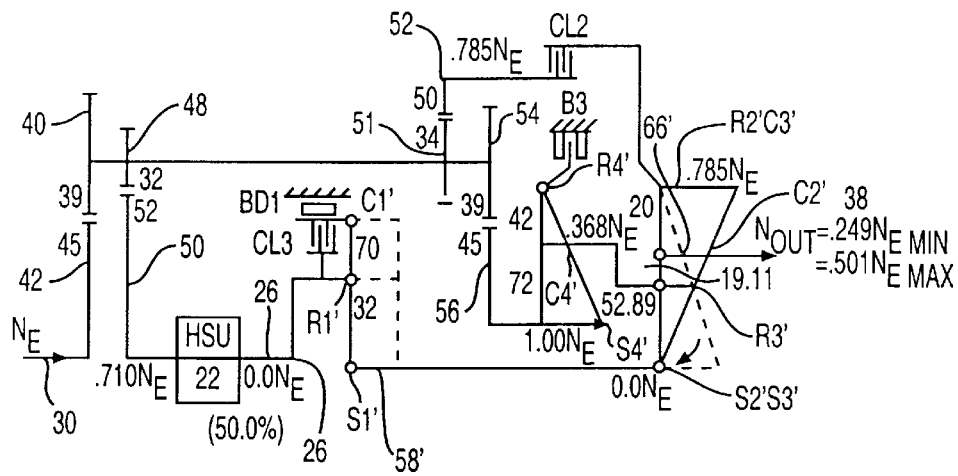

It will be noted that the inputs to power transmitting gear system 32 in the second forward range are the same as in first forward range, i.e., the speed reduced HSU output on sun gears S2, S3 (clutch C3 engaged) and first gear system input 34 through the second drive ratio connection to drive sun gear S4. However, brake B3 is engaged in second forward range to impose a reaction force on ring gear R4, such that carrier C4 is driven at 0.368 Ne by the mechanical input drive at 1.0 Ne applied to sun gear S4. This fixes the angular orientation of lever 80' existing at the first to second forward range shift point (FIG. 3) for the duration of second forward range operation (FIG. 4). Since carrier C4 of planetary gear set 80 is tied to ring gear R3 of planetary gear set 74, ring gear R3 is driven at the same fixed speed as planet carrier C4. This establishes ring gear point R3' as a fixed pivot point for lever 66'. Then, as HSU is downstroked from 98.2% stroke to 0% stroke to accelerate through second forward range, lever 66' is pivoted about point R3' in the clockwise direction from its dashed line position to its solid line position seen in FIG. 4. As a result, the transmission output speed on carrier C2 is increased from 0.249 Ne at the lower end of first forward range to 0.501 Ne at the upper end of second forward range (the second to third forward range shift point), as indicated by the further rightward shift of point C2' in FIG. 4.

It will also be noted in FIG. 4 that, at the lower end of second forward range (the second to third forward range shift point) the speeds of planetary gear set 58 elements have all been reduced to zero at 0% HSU stroke. By virtue of the exemplary combined gear of interconnected planetary gear sets 66, 74, the forward speed of interconnected carrier C3 and ring R2 gears is 0.785 Ne at the upper end of second forward range. Since HSU 22 is downstroked to accelerate through second forward range, the HSU 22 operates regeneratively. Nevertheless, the HSU output contributes to transmission output speed and torque in second forward range and there is a hydromechanical speed range.

As illustrated in the table of FIG. 8, brake BD1 and clutch CL2 are engaged as clutch CL3 and brake B3 are disengaged to shift the transmission into the third forward range. The engagement of brake BD1 is seen to ground carrier C1 of planetary gear set 58. Since carrier C1 is stationary at the second to third forward range shift point, its grounding by brake BD1 is synchronous. Moreover, by virtue of the exemplary ratios of spur gear sets 40, 42 and 51, 52 given above, the mechanical input on spur gear 52 may be made to equal the forward speed 0.785 Ne of interconnected carrier C3 and ring gear R2 at the second to third forward range shift point. Thus engagement of clutch CL2 to shift into third forward range is also synchronous.

Figure 5:
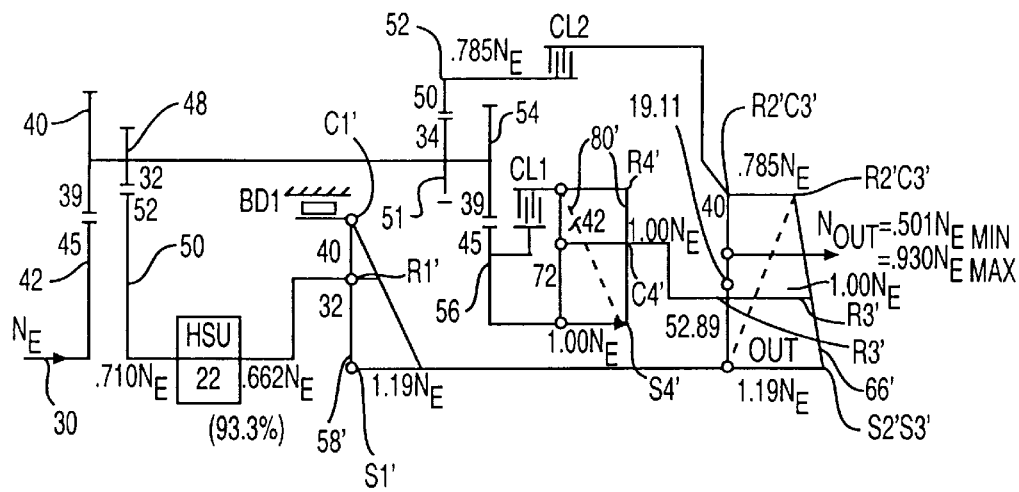

FIG. 5 is a Lever Analogy graphical representation according transmission 20 in FIG. 1 at the shift point between the third and the fourth forward ranges. To accelerate through third forward range, HSU is now upstroked from 0% to, for example, 93.3% stroke, that is, from 0 Ne to the maximum speed of 0.662 Ne. As the HSU output 26 speed applied to ring gear R1 increases, lever 58' pivots counterclockwise about the grounded carrier fixed point C1', and sun gear S1 is driven from 0 Ne up to a maximum speed of 1.19 Ne by virtue of planetary gear set 58 now being conditioned as a speed increasing gear set, rather than 1:1 gear set as in first and second forward ranges. Sun gears S2 and S3 are driven at the same speed due to their common connection with sun gear S1. Note that the mechanical input applied to interconnected carrier C3 and ring gear R2 through clutch CL2 establishes point R2'C3' on lever 66' as a fixed point. Thus, as the HSU is upstroked in third forward range, the increasing speed on sun gears S2, S3 pivots lever 66' counterclockwise about pivot point R2'C3' from its dashed line position at 0% stroke to its solid line position in FIG. 5 at 93.3% stroke. It is seen that the transmission output speed on carrier C2 has increased from 0.501 Ne at the lower end of third forward range to 0.930 Ne at the third to fourth range shift point. At the upper end of third range, the forward speed of ring gear R3 has reached 1.0 Ne, which also appears on carrier C4. Since the mechanical input via spur gear sets 42, 44 and 54, 56 applied to sun gear S4 is also 1.0 Ne, lever 80' representing planetary gear set 80 assumes the vertical orientation seen in FIG. 5. Consequently, ring gear R4 is also spinning at 1.0 Ne forward speed. Since brake B3 is not engaged, there is no reaction force to this mechanical input, which consequently does not contribute to output speed and torque.

Figure 6:
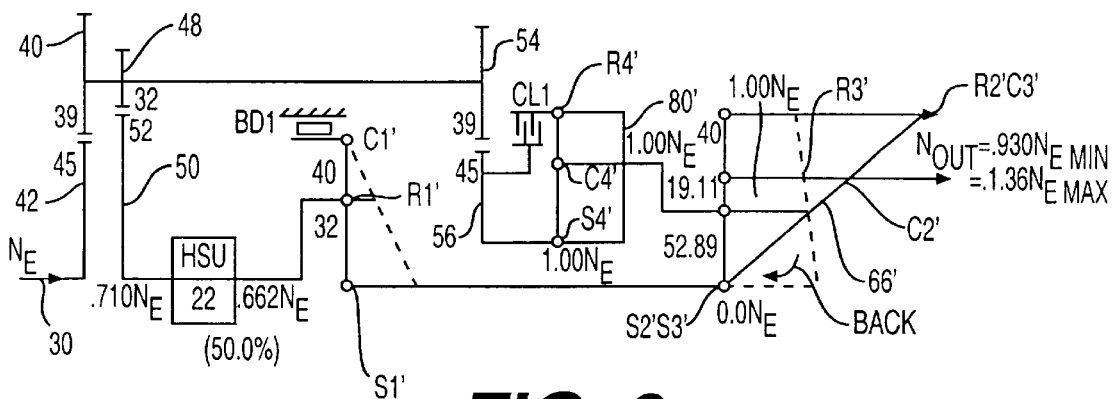

FIG. 6 is a Lever analogy graphical representation of transmission 20 in FIG. 1 operating in fourth forward range. As illustrated the table of FIG. 8, brake BD1 remains engaged and clutch CL1 is engaged as clutch CL2 is disengaged to shift the transmission into fourth forward range. Engagement of clutch CL1 is seen to apply the 1.0 Ne engine speed on spur gear 56 to ring gear R4 of fourth planetary gear set 80. Since the forward speed of ring gear R4 at the third to fourth forward range and shift point is also 1.0 Ne, the shift into fourth range is also synchronous. As noted above, this 1.0 Ne mechanical unit is also applied directly to sun gear S4. Thus, the vertical orientation of lever 80' is fixed, and the direct connection of carrier C4 with ring gear R3 establishes point R3' on lever 66' as a fixed pivot point.

To accelerate through fourth forward range, HSU 22 is downstroked from 93.3% to 0% stroke. As seen in FIG. 6, the decreasing forward speed in sun gears S2, S3 pivots lever 66' clockwise about pivot point R3'. As a result, the transmission output on carrier C2 increases from 0.93 Ne to a maximum transmission output speed of 1.36 Ne when HSU 22 is downstroked to 0%. Thus, the HSU 22 works regeneratively in fourth forward range as well as second forward range.

FIG. 7 is a Lever Analogy graphical representation according to the Lever Analogy of transmission of FIG. 1 operating in a reverse range. As illustrated in the table of FIG. 2, brake B2 and clutch CL3 are engaged to shift the transmission into the reverse range. The engagement of the clutch CL3 serves the same purpose as first and second forward ranges, i.e., to couple ring R1 and C1 together such that they are commonly driven at the HSU output speed. Thus, sun gears S1, S2 and S3 are all driven at the HSU output speed.

The engagement of brake B2 grounds ring gear R3 of planetary gear set 74. This establishes point R3' on lever 66' as a fixed pivot point. Thus, when HSU is upstroked from 0% stroke to 100% stroke to accelerate through reverse range, the increasing speed on sun gears S2, S3 pivots lever 66' counterclockwise about point R3' to produce an increasing reverse transmission output speed on carrier C2. At the exemplary gear ratios, maximum reverse speed is 0.256 Ne at 100% HSU stroke.

It will be noted that brake B2 also grounds carrier C4 in reverse range. In response to the 1.0 NE input on sun gear S4, lever 80' represents planetary gear set 80. Since there is no reaction force to this input, it does not contribute to transmission output speed torque in reverse range.

It will be apparent to those skilled in the art that various modifications and variations, such as specific gear ratios, can be made in the multi-range, continuously variable hydromechanical transmission of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A multi-range hydromechanical transmission for transmitting power from a prime mover to a load, comprising:

a continuously variable hydrostatic transmission unit having an input and an output;

a speed reduction unit for coupling an output of the prime mover to the hydrostatic transmission input to drive the hydrostatic input at input speeds lower than output speeds of the prime mover;

a first gear set driven by the hydrostatic transmission unit output to provide output speeds of the first gear set in at least first and second continuously variable first gear set output speed ranges, the second continuously variable first gear set output speed range being wider than the first continuously variable first gear set speed range;

a gear system including at least second and third gear sets having gear elements connected to receive the hydrostatic transmission unit output via the first gear set and mechanical inputs from the prime mover at first and second speed ratios; and shift means for selectively clutching and braking the gear elements of the first, second, and third gear sets to shift the hydromechanical transmission between at least two transmission output speed ranges, one of the transmission output speed ranges being continuously variable by stroking the hydrostatic transmission unit through the first continuously variable first gear set output speed range and the other of the transmission output speed ranges being continuously variable by stroking the hydrostatic transmission unit through the second continuously variable first gear set output speed range.

2. The multi-range hydromechanical transmission of claim 1, wherein the gear system includes a fourth gear set, and the shift means includes plural brakes and clutches for selectively braking and clutching gear elements of the first through fourth gear sets to shift the hydromechanical transmission into any one of at least four forward speed ranges and one reverse speed range, the one transmission output speed range being a second forward speed range, and the other transmission output speed range being a third forward speed range.

3. The multi-range hydromechanical transmission of claim 2, wherein the brakes and clutches of the shift means are selectively released and engaged in timed relation to achieve synchronous shifting of the hydromechanical transmission between the four speed forward ranges and one reverse speed range.

4. The multi-range hydromechanical transmission of claim 1, wherein the first gear set is a first planetary gear set having a sun gear, a planet gear carrier, and a ring gear, the ring gear being connected to be driven by the hydrostatic transmission unit output, and the shift means includes a first brake and a first clutch, the first clutch selectively interconnects the ring gear and planet gear carrier, such that the sun gear is driven in the first first gear set output speed range, and the first brake selectively grounds the planet gear carrier, such that sun gear is driven in the second first gear set output speed range.

5. The multi-range hydromechanical transmission of claim 4, wherein the second and third gear sets are second and third planetary gear sets.

6. The multi-range hydromechanical transmission of claim 5, wherein the second planetary gear set includes a sun gear drivingly connected to the sun gear of the first planetary gear set, a planet gear carrier on which the hydromechanical transmission output is produced, and a ring gear; and the third planetary gear set includes a sun gear connected to the sun gear of the first planetary gear set, a planet gear carrier connected to the ring gear of the second planetary gear set, and a ring gear; and the shift means further includes a second brake that is selectively grounds the ring gear of the second planetary gear set and the planet gear carrier of the third planetary gear set while the first clutch is engaged, such as to produce a hydromechanical transmission output on the planet gear carrier of the second planetary gear set in a first forward speed range.

7. The multi-range hydromechanical transmission of claim 6, wherein the shift means further includes a third brake that is selectively engaged to ground the ring gear of the third planetary gear set while the first clutch is engaged, such as to produce a hydromechanical transmission output on the planet gear carrier of the second planetary gear set in a reverse speed ranges.

8. The multi-range hydromechanical transmission of claim 7, wherein the gear system further includes a fourth planetary gear set having a sun gear connected to be driven at the first mechanical input speed ratio, a planet gear carrier connected to the ring gear of the third planetary gear set, and a ring gear; and the means elements further includes a fourth brake that is selectively braked to ground the ring gear of the fourth planetary gear set which the first clutch is engaged, such as to produce a hydromechanical transmission output on the planet gear carrier of the second planetary gear set in the one transmission output speed range, which is a second forward speed range.

9. The multi-range hydromechanical transmission of claim 8, wherein the shift means further includes a second clutch for selectively connecting the planet gear carrier of the third planetary gear set to be driven at the second mechanical input speed ratio while the first brake is engaged, such as to produce a hydromechanical transmission output on the planet gear carrier of the second planetary gear set in the other transmission output speed range, which is a third forward speed range.

10. The multi-range hydromechanical transmission of claim 9, wherein the shift means further includes a third clutch for selectively connecting the ring gear of the fourth planetary gear set to be driven at the first mechanical input speed ratio while the first brake is engaged, such as to produce a hydromechanical transmission output on the planet gear carrier of the second planetary gear set in a fourth forward speed range.

* * * * *